Figure 1:
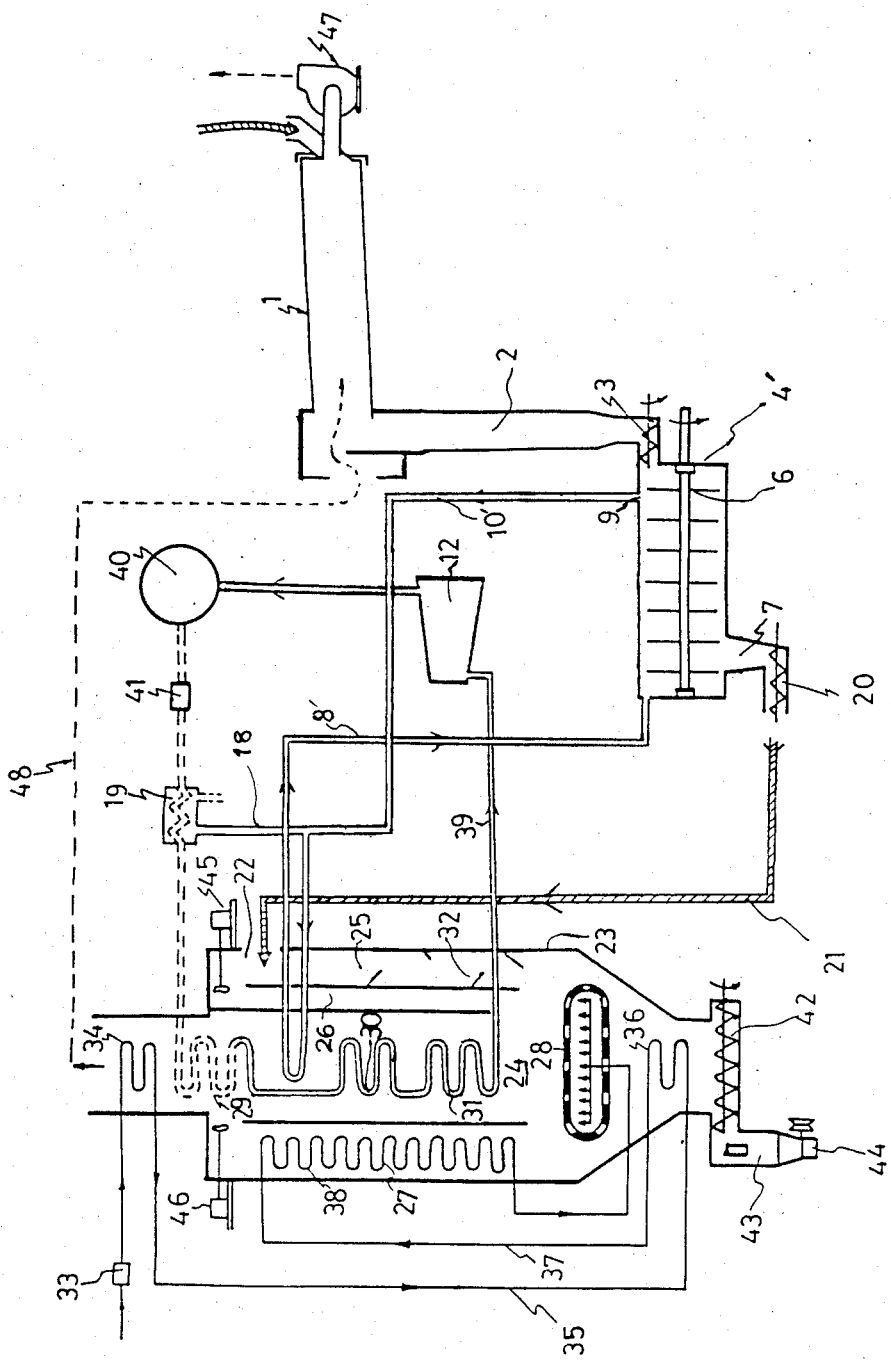

United States Patent [19]

Kuo

[11] Patent Number: 4,656,955

[45] Date of Patent: Apr. 14, 1987

[54] REFUSE INCINERATION SYSTEM

[76] Inventor: Tsung H. Kuo, No. 5, Alley 57, Lane 158, Mi Tou Rd., Cha-Yi, Taiwan

[21] Appl. No.: 858,598

[22] Filed: May 1, 1986

[51] Int. Cl.$^4$ ............................................. F23G 5/04
[52] U.S. Cl. ..................................... 110/346; 110/224; 110/226; 110/227; 110/228; 110/234; 122/2
[58] Field of Search ............... 110/224, 225, 226, 227, 110/228, 234, 238, 346; 122/2

[56] References Cited

U.S. PATENT DOCUMENTS

| | | | |
|---|---|---|---|
| 2,148,447 | 2/1939 | Dundas et al. | 110/224 X |
| 4,091,748 | 5/1978 | Mansfield | 110/228 |
| 4,186,668 | 2/1980 | Tabel | 110/224 X |
| 4,502,397 | 3/1985 | Hochmuth | 110/346 |
| 4,517,925 | 5/1985 | Mackenzie et al. | 122/2 |

*Primary Examiner*—Edward G. Favors

[57] ABSTRACT

In an improved refuse incineration system, wet refuse is heated in a dryer by inlet superheated steam in direct contact to remove most moisture therefrom while converting such moisture into outlet steam also in superheated state. The dried refuse is then fed into a boiler, through which the outlet superheated steam is circulated to raise temperature to much higher superheated level and recycled to the dryer as inlet superheated steam. This system will greatly increase the drying efficiency and productivity and thus reduce the necessary volume of the dryer.

4 Claims, 1 Drawing Figure

REFUSE INCINERATION SYSTEM

CROSS REFERENCE

U.S. Pat. No. 4,516,511 was issued to the same inventor on May 14, 1985.

DESCRIPTION OF INVENTION

This invention relates to an improvement of refuse incineration system, particularly to the dryer used in the system.

U.S. Pat. No. 4,516,511 issued to the same inventor discloses a method of refuse incineration essentially comprising the step of drying wet refuse before passing the latter to a boiler adapted to generate high-pressure superheated steam for mechanical work in an expander, in the drying step the wet refuse is heated in a dryer by a heating medium in order to vaporize most of the moisture contained in said wet refuse to produce vapor.

In this state of the art, the heating medium employed in the dryer is saturated or unsaturated steam. So that a heating jacket should be provided for the dryer and a great quantity of condensate is formed, both resulting greater volume of the dryer being required and reduced working efficiency of the dryer and entire system.

Therefore, a primary object of this invention is to provide an improved incineration system over U.S. Pat. No. 4,516,511 whereby the drying efficiency and productivity of the dryer is increased and the necessary volume is reduced.

According to the present invention there is provided a method of refuse incineration comprising the step of drying the refuse before passing the latter to a boiler adapted to generate high-pressure superheated steam for producing mechanical work, wherein, in said drying step the refuse is heated in a dryer by inlet heating superheated steam in direct contact to vaporize most of the moisture contained in said refuse to form generating steam being combined with said heating steam to become outlet superheated steam, which is circulated through said boiler to raise temperature to much higher superheated level and recycled to the dryer as inlet heating superheated steam.

The aforementioned and other objects and features will be more apparent from the following description with reference to the sole accompanying drawing which is a schematic flow diagram of an improved incineration system embodying the present invention.

Since this application is an improvement over the prior art of U.S. Pat. No. 4,516,511 directing to the dryer, most of the subject refuse incineration system except the dryer is almost the same as that disclosed in said prior art and denoted by same symbols, which will be neglected in the following description, and thus U.S. Pat. No. 4,516,511 is incorporated herein for reference. Further the modified members are also indicated with same numbers but added with a prime.

The drawing shows a flow diagram of a refuse incineration system embodying the present invention, in which the wet refuse, after conventional pre-treatment, such as crushing, magnetic separation and the like, is fed through a preheater 1, into a refuse receptacle 2, and then squeezed therefrom by means of screw conveyor 3 into a continuous agitating dryer 4' without steam jacket. The refuse is transported slowly through dryer 4' in the direction towards the outlet 7, and agitated by rake agitation blade 6. In dryer 4' the refuse, and the moisture contained therein, is heated in direct contact by steam at substantial atmospheric pressure and at a superheated temperature in a range of about 400° C. to 600° C., but not limited here, and preferably around 550° C. The moisture is vaporized as generating steam and combined with said heating superheated steam. The combined steam is collected at vent 9.

The refuse after being dried in the dryer 4' is sent out by a screw conveyor 20 through an enclosed and insulated conveyor indicated by line 21, into the inlet 22 of the boiler 23, for the combustion in said boiler 23 to generate high-pressure superheated steam for producing mechanical work in the expander 12, as referred in detail to mentioned U.S. Pat. No. 4,516,511.

Said combined steam in the process from drying the refuse in the dryer 4' to being discharged out of vent 9 is maintained under superheated state, and thus no condensate will be formed. A best heat transfer effieiency will be reached by such a direct contact of superheated steam with refuse. Accordingly, good drying efficiency yields high productivity. And for given capacity, smaller dryer will be enough for treatment.

Although the combined steam collected at vent 9 is kept in superheated state, but the temperature is much lower than that of the inlet superheated steam introduced into the dryer 4' for heating the refuse. So that the steam collected at vent 9 is introduced through line 10' into the appropriate, e.g. upper space of the combustion chamber 24 of the boiler 23 to raise the superheated temperature in a range of about 400° C. to 600° C., and preferably around 550° C., then recycled through line 8' the dryer 4' as inlet superheated steam.

In the dryer, the amount of superheated steam required for the vaporization of one kilogram of water depends on the superheated temperature of the steam. The higher the temperature, the lesser the steam is required. Take the tempeature of the inlet superheated steam being 550° C. for example, the heat content carried by one kilogram of steam is $$Q = Cp_{avg.}(550 - 100)$$
$$= 0.574 \times 450 = 258 \text{ Kcal}$$

Suppose the temperature of entering refuse after preheated in the preheater 1 is just 100° C., then the heat of vaporization of the water per one kilogram is 539 Kcal.

539 Kcal/258 Kcal=2.1

Therefore, to remove one kilogram of water requires about 2.1 Kgs of superheated steam at 550° C. In order to assure that the drying process is kept under superheated state, a slight excess of superheated steam is employed, e.g. 2.3 Kgs. In other words, about 2.3 Kgs of superheated steam is recycled for removal of one kilogram of water.

In other hand, it is supposed that 0.2 kilogram of water is removed per one kilogram of refuse upon drying in the dryer 4', in this connection 0.46 kilogram of recycled superheated steam is required.

But 0.2 kilogram of generated steam is additionally collected at vent 9. This additional steam is introduced via line 18 into the heater 19 where it is used for heating up the boiler feed water.

What I claim is:

1. A method of refuse incineration comprising the step of drying the refuse before passing the latter to a boiler adapted to generate high-pressure superheated steam for producing mechanical work in an expander, wherein, in said drying step, the wet refuse is heated in a dryer by a heating medium in directly contact to vaporize most of the moisture contained in said refuse to produce vapor, recovering said vapor and confining it into said heating medium.

2. A method as claimed in claim 1, wherein part of said vapor is introduced to a heater for heating up the boiler feed water.

3. A method as claimed in claim 1, wherein said heating medium is superheated steam.

4. A method as claimed in claim 1, wherein said vapor so produced is also at superheated state.

* * * * *